(12) United States Patent
Bohn (10) Patent No.: US 11,444,488 B2
(45) Date of Patent: Sep. 13, 2022

(54) WIRELESS CHARGING FOR OPTICAL DEVICE

(71) Applicant: Microsoft Technology Licensing, LLC, Redmond, WA (US)

(72) Inventor: David Douglas Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 16/885,464

(22) Filed: May 28, 2020

(65) Prior Publication Data
US 2021/0376661 A1 Dec. 2, 2021

(51) Int. Cl.
*H02J 50/10* (2016.01)
*G02B 27/01* (2006.01)

(52) U.S. Cl.
CPC ............ *H02J 50/10* (2016.02); *G02B 27/017* (2013.01); *G02B 2027/0178* (2013.01)

(58) Field of Classification Search
CPC   H02J 50/10; G02B 27/017; G02B 2027/0178
USPC ....................................................... 307/104
See application file for complete search history.

(56) References Cited

U.S. PATENT DOCUMENTS

| | | | | |
|---|---|---|---|---|
| 2013/0120706 | A1* | 5/2013 | Kakinuma | G02B 30/24 351/158 |
| 2013/0141037 | A1* | 6/2013 | Jenwatanavet | H02J 50/20 320/108 |
| 2015/0002808 | A1 | 1/2015 | Rizzo et al. | |
| 2017/0170688 | A1* | 6/2017 | Maniktala | H01F 38/14 |
| 2018/0113329 | A1* | 4/2018 | Rousseau | G02B 27/017 |
| 2019/0052111 | A1* | 2/2019 | Wu | G02B 27/017 |
| 2019/0245523 | A1 | 8/2019 | Lemoff et al. | |
| 2019/0272800 | A1* | 9/2019 | Tao | G09G 5/006 |
| 2019/0369417 | A1* | 12/2019 | Kniess | G02B 13/16 |
| 2020/0209628 | A1* | 7/2020 | Sztuk | G02B 27/0176 |

FOREIGN PATENT DOCUMENTS

CN   207504616 U   6/2018
CN   111033361 A   4/2020

OTHER PUBLICATIONS

"International Search Report and Written Opinion Issued in PCT Application No. PCT/US21/032356", dated Jul. 16, 2021, 10 Pages.

* cited by examiner

*Primary Examiner* — Alfonso Perez Borroto
(74) *Attorney, Agent, or Firm* — Holzer Patel Drennan (57) ABSTRACT

The disclosed technology provides an electronic device including an eyepiece and a wireless charging coil forming at least one loop around the eyepiece. The charging coil is coupled to a rechargeable battery and adapted to inductively charge the rechargeable battery when the electronic device is positioned such that the wireless charging coil is within a magnetic field generated by a wireless charging source.

19 Claims, 8 Drawing Sheets

WIRELESS CHARGING FOR OPTICAL DEVICE

BACKGROUND

Inductive charging uses wireless charging coils and is a desirable way to charge mobile devices. Although mobile device designs continuously trend toward slimmer, smaller form-factors, wireless charging speed decreases in proportion to coil diameter. Although larger diameter coils provide more efficient charging, some devices have a form-factor that lacks adequate surface area for embedding a larger charging coil. Eyewear presents a unique challenge. Although head-mounted displays (HMDs) used to facilitate virtual reality (VR) and/or augmented reality (AR) experiences are growing in popularity, many HMD devices are bulky and uncomfortable with battery packs being designed to rest on the side or back of the user's head.

SUMMARY

In at least one implementation, the disclosed technology provides an optical electronic device adapted for wireless charging. The optical electronic device includes a wireless charging coil that forms at least one loop around an eyepiece. The wireless charging coil is coupled to a rechargeable battery and adapted to inductively charge the rechargeable battery when the electronic device is positioned such that the wireless charging coil is within a changing magnetic field generated by a wireless charging source.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

The herein disclosed technology provides for various space-efficient wireless charging configurations that may be suitable for implementation in a variety of optical devices, including without limitation head-mounted display (HMD) devices that provide augmented reality (AR) and virtual reality (VR) experiences. As used herein, the term "AR/VR device" is used to refer to an HMD device that is adapted to operate in either a virtual reality mode to provide a virtual reality experience and/or operate in an augmented reality mode to provide an augmented reality experience.

According to one implementation, an AR/VR device disclosed herein includes a charging coil embedded within or attached to a frame of a VR/AR device. The charging coil is bent to form one or more loops that generally encircle an eyepiece (lens) of the VR/AR device. In various implementations, the one or more loops may encircle any of (1) a single eyepiece designed to provide a line of sight to a single eye; (2) a single eyepiece designed to provide a line of sight to both eyes; or (3) multiple eyepieces each designed to provide a line of sight to a different eye. The loops of the charging coil may be embedded within or otherwise attached to a frame of the AR/VR device (e.g., a bezel of the eyepiece) or directly attached to a lens of the eyepiece. The various implementations disclosed herein provide efficient charging solutions achieved without damaging fragile optics within the AR/VR device.

Figure 1:
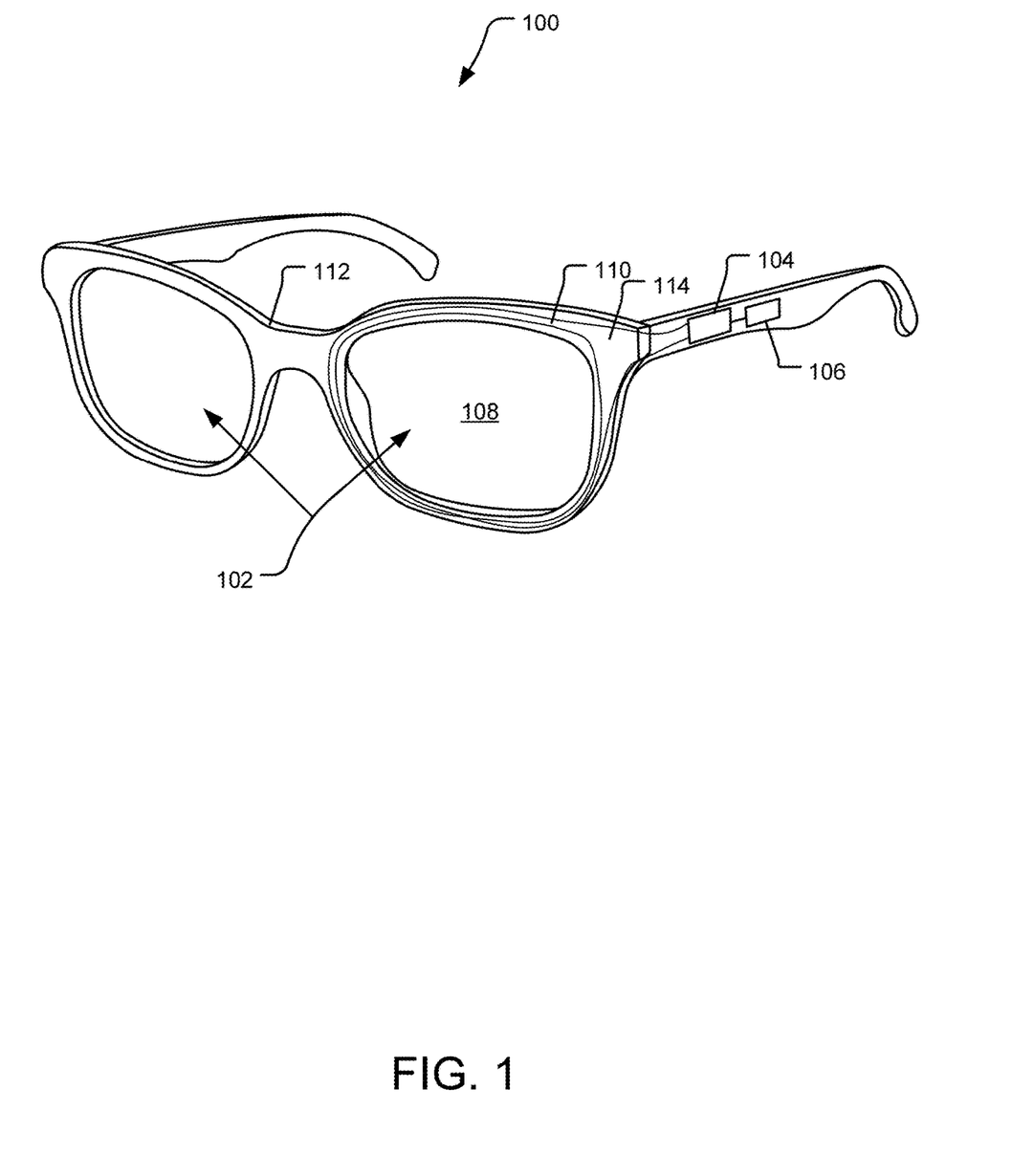
FIG. 1 illustrates an example electronic device that includes optical components and electronics powered by a rechargeable battery that can be wirelessly recharged.

FIG. 1 illustrates an example optical electronic device 100 that includes optical components 102 and control electronics 104 powered by a rechargeable battery 106 with wireless charging capability. The optical components 102 include at least one eyepiece 108 including a lens or a collection of lenses and may, in some implementations, include other optical components such as projection optics, waveguides, microdisplays, etc.

The optical electronic device 100 of FIG. 1 is a head-mounted display (HMD) device with a slim form factor of a pair of glasses. The optical components 102 and control electronics 104 are, in some implementations, adapted to provide a user with a virtual and/or augmented reality experience by projecting digital objects within a user's field of view while the user is looking through the eyepiece 108. In various implementations, the optical electronic device 100 assumes a variety of forms different from that shown in FIG. 1 including, for example, other HMDs such as a goggles and headsets of a variety of shapes and sizes as well as non-HMD optical devices including binoculars, monocular devices, cameras, and any other portable device with optical and electronic components.

The optical electronic device 100 includes a wireless charging coil 110 embedded within a device frame 112 and arranged to form multiple wire that encircle the eyepiece 108, as shown. In various implementations, the number of wire loops formed by the wireless charging coil 110 may vary between one single loop and many loops (e.g., tens of loops) in order to provide optimal charging characteristics that satisfy the unique charging specifications of the optical electronic device 100.

In one implementation, the wireless charging coil 110 is embedded within a bezel 114 of the device frame 112 that surrounds and supports the eyepiece 108. In another implementation, the wireless charging coil 110 is included on an exterior surface of the bezel 114 rather than embedded within it. In still other implementations, the wireless charging coil 110 is directly attached a rim portion of the eyepiece 108 (e.g., the lens itself). For example, the wireless charging coil 110 may be made out of a transparent conductive material, such as ITO, such that attachment of the wireless coil 110 to the rim of the lens would not obstruct the line of sight through the lens.

The wireless charging coil 110 is electrically coupled to a rechargeable battery 106 that supplies power to support the control electronics 104. In different implementations, the rechargeable battery 106 may assume any of a variety of different form factors including multi and single cell battery packs, lithium batteries, etc.

The wireless charging coil 110 is adapted to be inductively charged by a wireless charging source, sometimes referred to as a charging base or mat (not shown), that includes another similar coil provided with an AC current from a power source. When this AC current flows through the wireless charging source, an alternating magnetic field is created. When the wireless charging coil 110 is positioned to receive flux from this alternating field created, an electric current is generated within the wireless charging coil 110, thereby flowing current to restore the charge in the rechargeable battery 106. In general, the speed of inductive charging increases in proportion to the both the size of the loops formed by the wireless charging coil 110 as well as in proportion to the number of such loops. When the loops of the wireless charging coil 110 are formed around the eyepiece 108 (as shown), it is ensured that the loop size is sufficiently large to facilitate for full battery recharging within a reasonable time period, such as 30 minutes to a few hours, depending on the exact specifications of the battery, the number of turns in the wireless charging coil 110, and the size of the eyepiece 108 and the bezel 114.

Notably, the current that the charging source induces in the wireless charging coil 110 may be directed through intermediary circuitry, such as a transformer or other IC chip, prior to reaching the rechargeable battery 106. For example, this intermediary circuitry may adjust the charging current to ensure the battery is safely charged (and not overcharged) given specific battery parameters (e.g., temperature, current charge level, capacity), some of which may change with time and at different phases within the life and charge cycle of a battery.

In different implementations, the wireless charging coil 110 and supplemental intermediary circuitry may be adapted to ensure charging capability with a given standard, such as the Qi wireless charging standard.

Figure 2:
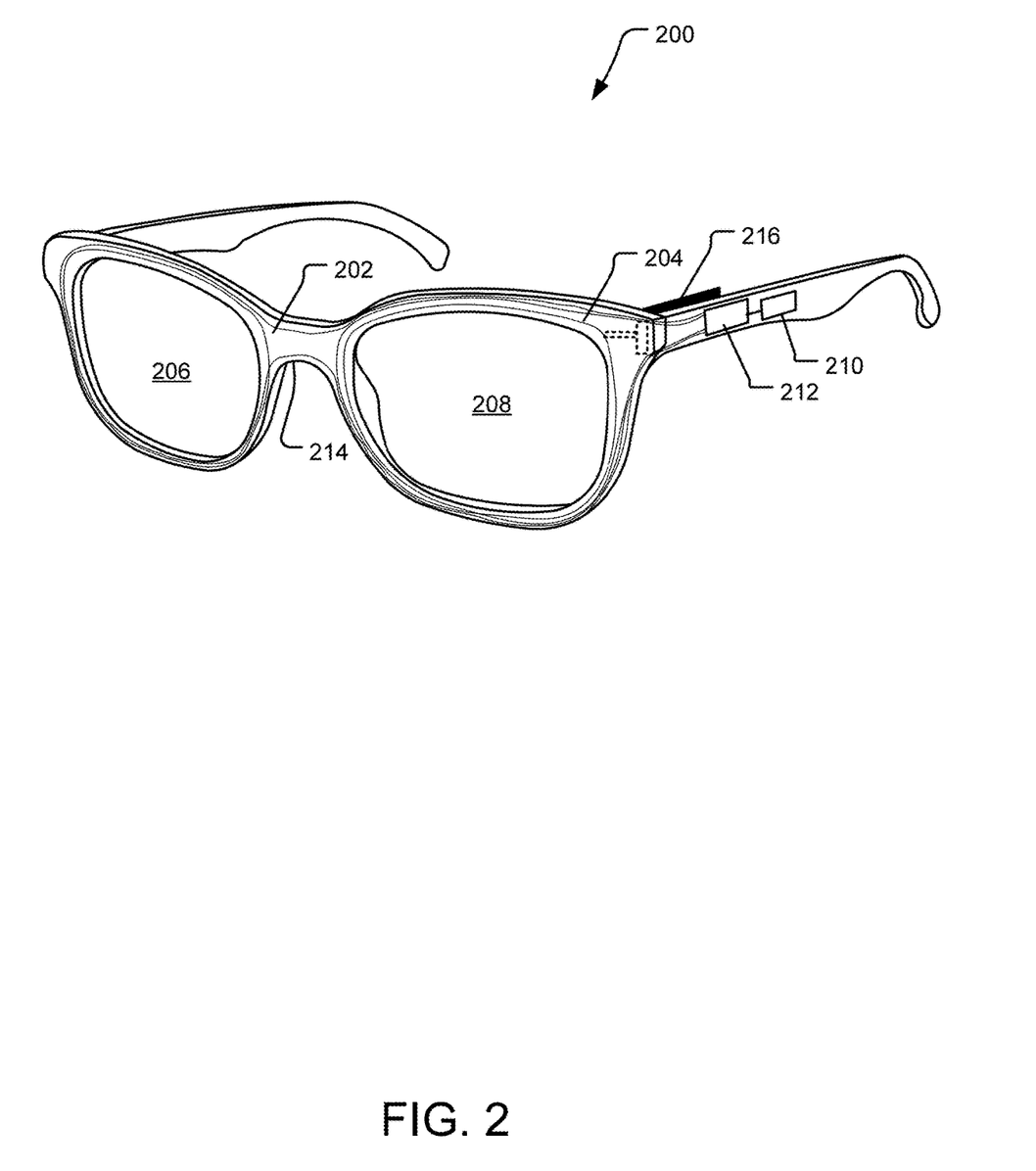
FIG. 2 illustrates an example head-mounted display (HMD) device that includes two wireless charging coils that provide fast and space-efficient wireless charging.

FIG. 2 illustrates an example HMD device 200 that includes two wireless charging coils 202 and 204 that each include one or more loops encircling a different one of two eyepieces 206 and 208. When the wireless charging coils 202 and 204 are positioned such that their respective loops receive changing magnetic flux from a charging base (not shown), a current is induced in each of the wireless charging coils 202 and 204, flowing two streams of current to charge a rechargeable battery 210.

During device operation, the rechargeable battery 210 supplies power to support on-board device electronics 212, which may, for example, including memory and processing electronics adapted to control a projection optics 216 to provide AR/VR projection and effects, audio and/or visual electronics and sensors such as a camera, depth and heat mapping electronics, proximity sensors, a microphone, speakers, etc. By example and without limitation, the projection optics 216 may include a projection source (e.g., a microdisplay) and one or more waveguides and/or coupling elements for projecting a digital image created by the projection source onto a plane within a field of view of a user wearing the HMD device 200.

Including two wireless charging coils 202 and 204 rather than one (as in FIG. 1) may effectively provide for a doubling in the speed by which the rechargeable battery 210 can be fully recharged. Depending on target device specifications, each of the two separate wireless charging coils 202 and 204 may include the same or a different number of loops. In one implementation, the two wireless charging coils 202 and 204 are electrically isolated from one another but each couple to a same battery or battery pack. In another implementation, the HMD device 200 includes two separate rechargeable battery packs and the two wireless charging coils 202 and 204 each supply current to a different one of the two rechargeable battery packs. For example, a separate battery back may be included on opposite sides of a frame 214 of the HMD device 200 such that a battery rests adjacent to each side of a user's face or temple while the HMD device 200 is worn.

Figure 3:
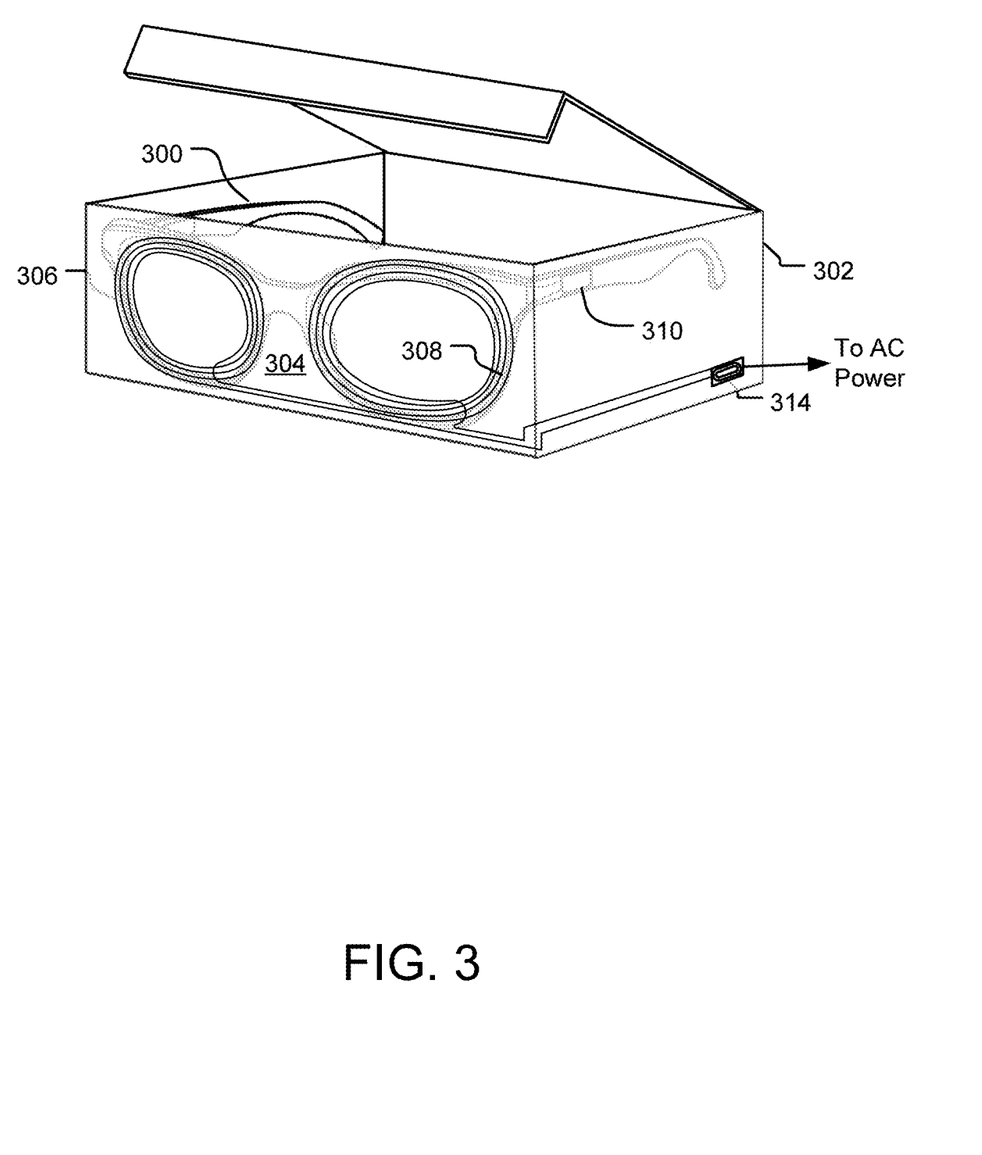
FIG. 3 illustrates an HMD device within an exemplary charging case.

FIG. 3 illustrates an example HMD device 300 within a charging case 302 that serves as a wireless charging source to wirelessly recharge one or more batteries (e.g., a battery 310) included within the HMD device 300. The charging case 302 may assume a variety of shapes and sizes but includes at least one side panel 304 that incorporates at least one wireless charging coil that serves as a charging source for the HMD device 300. In different implementations, the charging case 302 may include one or multiple wireless charging coils. By example and without limitation, the side panel 304 is shown to embed two separate charging coils 306, 308 that are each roughly positioned in proximity to a corresponding eyepiece of the HMD device 300. It may be assumed that the HMD device 300 also includes two wireless charging coils positioned the same or similar to those described above with respect to FIG. 2.

When the HMD device 300 is positioned within the wireless charging case 302 as shown, the charging coils in the HMD device 300 are each positioned proximal to a corresponding one of the charging coils 306, 308 within the side panel 304 such that there exists at least some overlap between the area encompassed by the loops defined each pair of aligned charging coils. For example, there exists at least some overlap between the area bounded by the loops of the wireless charging coil 306 and an area bounded by the corresponding coil around the left-most eyepiece of the HMD device 300 and there exists a same or similar overlap between the area bounded by the loops of the wireless charging coil 308 and an area bounded by the corresponding coil around a right-most eyepiece of the HMD device 300.

The speed at which charging occurs depends on the size of the above-mentioned overlapping coil areas as well as the number of loops within each coil, and these parameters may be individually tailored to ensure different charging specifications in different implementations.

Each of the wireless charging coils 306 and 308 is adapted to receive power from a power source 314, which may be either a battery in the charging case 302 or a charging port on the charging case 302 that may be selectively coupled to an AC outlet or other external power source. When the charging case 302 is in a charging mode (e.g., plugged in and/or configured by a switch or button to enable charging), AC current flows through each of the two wireless charging coils 306 and 308. This AC current flow creates a rapidly changing magnetic field that passes through each of the loops defined by the two wireless charging coils within the HMD device and this, in turn, induces a current flow within each of the charging coils of the HMD device 300 to flow current to one or more rechargeable batteries within the HMD device 300, such as in the manner described above with respect to FIG. 1-2.

By including the charging coils in a side panel 304 of the charging case 302, the HMD device 300 can be charged in the lateral position (as shown), as opposed to on on-end with eyepieces parallel to an underlying table or support surface. Consequently, charging may occur without any physical contact between the eyepieces of the HMD device 300 and other surfaces, mitigating a risk of damage to the fragile optical components.

Figure 4:
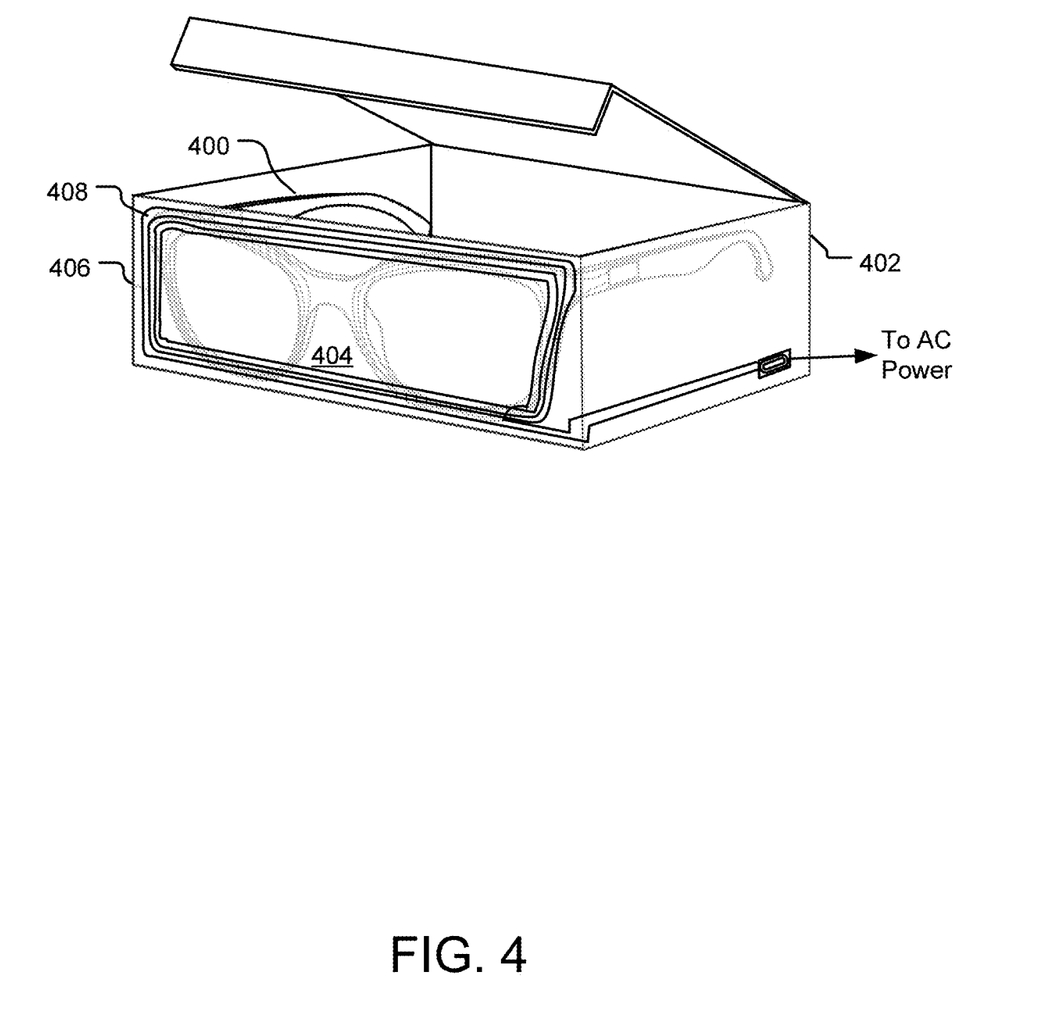
FIG. 4 illustrates another HMD device within another exemplary charging case.

The inclusion of two charging coils in the charging case 302 rather than a single coil (e.g., as shown in FIG. 4) facilitates a closer size and orientation match between each coil in the charging case 302 and the corresponding coil in the HMD device 300 (e.g., coils of each pair may have a similar pantoscopic tilt, wrap angle of the lenses, etc.). This match in size and orientation boosts coupling efficiency. In one implementation, the two coils 306, 308 in the case are electrically isolated from one another to prevent cross interference. In another implementation, the two coils 306, 308 are operated at different frequencies so as to prevent interference.

FIG. 4 illustrates another example HMD device 400 within a charging case 402 that serves as a wireless charging source to wirelessly recharge one or more batteries (e.g., a battery 410) included within the HMD device 400. The charging case 402 different from that of FIG. 3 in that a side panel 404 of the charging case 402 embeds one large charging coil 408 instead of two separate charging coils. In this configuration, the HMD device 400 may include either one charging coil around an eyepiece (e.g., as shown in FIG. 1) or two separate coils around each of the two eyepieces (as shown in FIG. 2). From a manufacturing perspective, the case 402 may be simpler to construct and may require a less precise alignment between the charging coils the HMD device 400; however, this less precise alignment and sizing between the coils may cause the charging case 402 to have a a lower coupling efficiency with the HMD device 400 than that of the charging case 302 of FIG. 3. Other aspects of the charging case 402 or HMD device 400 not described specifically with respect to FIG. 4 may be understood as being the same or similar to other similarly-named components described herein.

Figure 5:
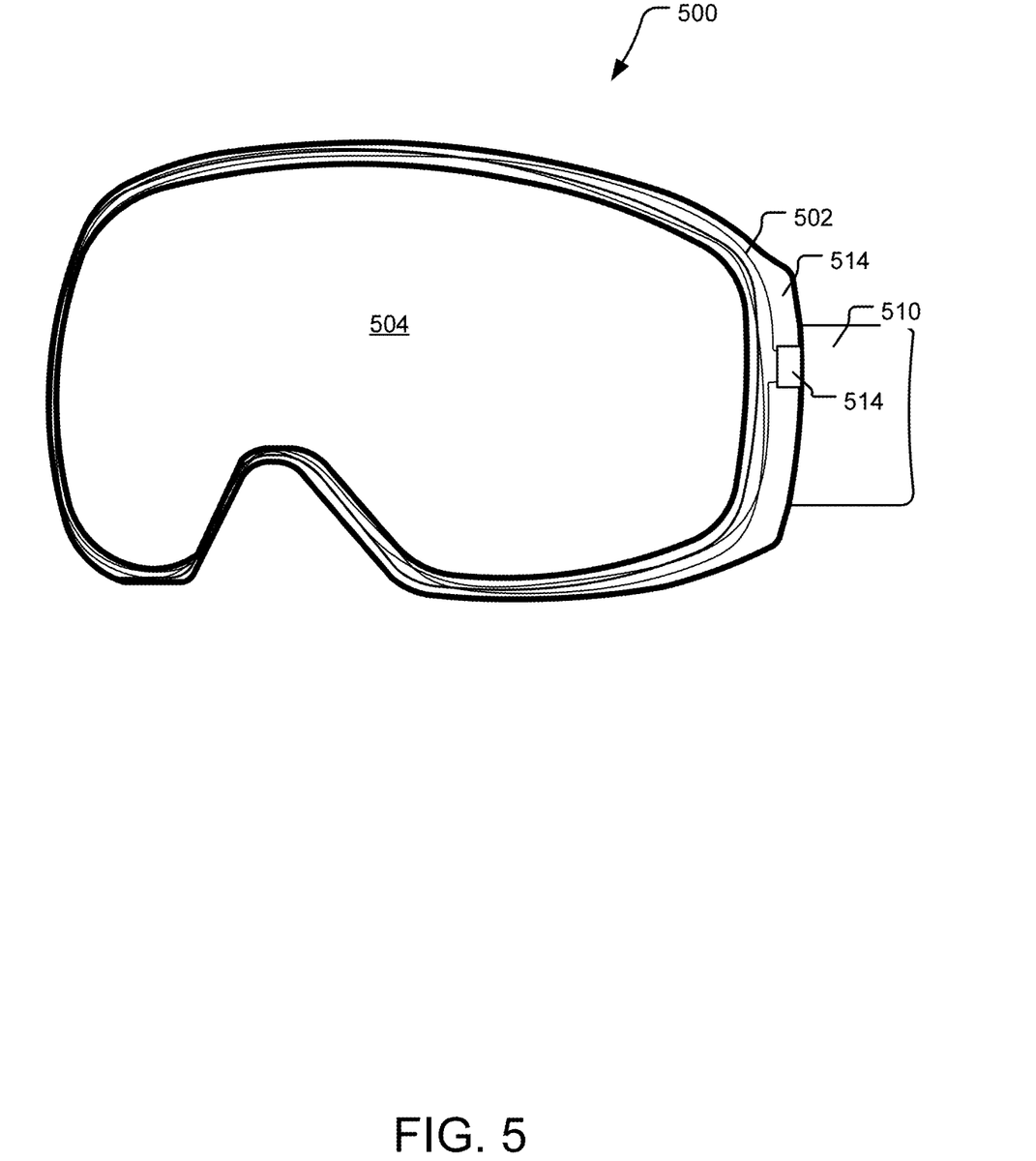
FIG. 5 illustrates yet another example HMD device that includes a wireless charging coil forming one or more loops around an eyepiece.

FIG. 5 illustrates yet another example HMD device 500 that includes a wireless charging coil 502 forming one or more loops around an eyepiece 504. In FIG. 5, the HMD device 500 includes a single eyepiece that is large enough to extend across and align with both of a user's eyes when worn. For example, the HMD device 500 may be a pair of AR/VR goggles, such ski goggles or other tactical or protective goggles. In contrast to other configurations shown herein, the wireless charging coil 502 does not form an elliptically shaped loop but rather, an irregularly shaped loop that encompasses an area roughly the size of the eyepiece 504. The wireless charging coil 502 may, for example, be embedded within a bezel 514 around the eyepiece 504 or be positioned to form an external surface of the bezel 514.

By example and without limitation, the HMD device 500 includes a flexible band 510 that adjustably secures the HMD device 500 to a user's head. Electrical components, such as memory, sensors, and processing components, and a rechargeable battery pack 512 may be incorporated within or attached to the bezel 514 or, in some implementations, attached to the flexible band 510 and positioned at some offset distance relative to the eyepiece 504 and bezel 514. An electrical coupling exists between the wireless charging coil 502 and the rechargeable battery pack 512 such that current induced in the wireless charging coil 502 may flow to the rechargeable battery pack 512.

Figure 6:
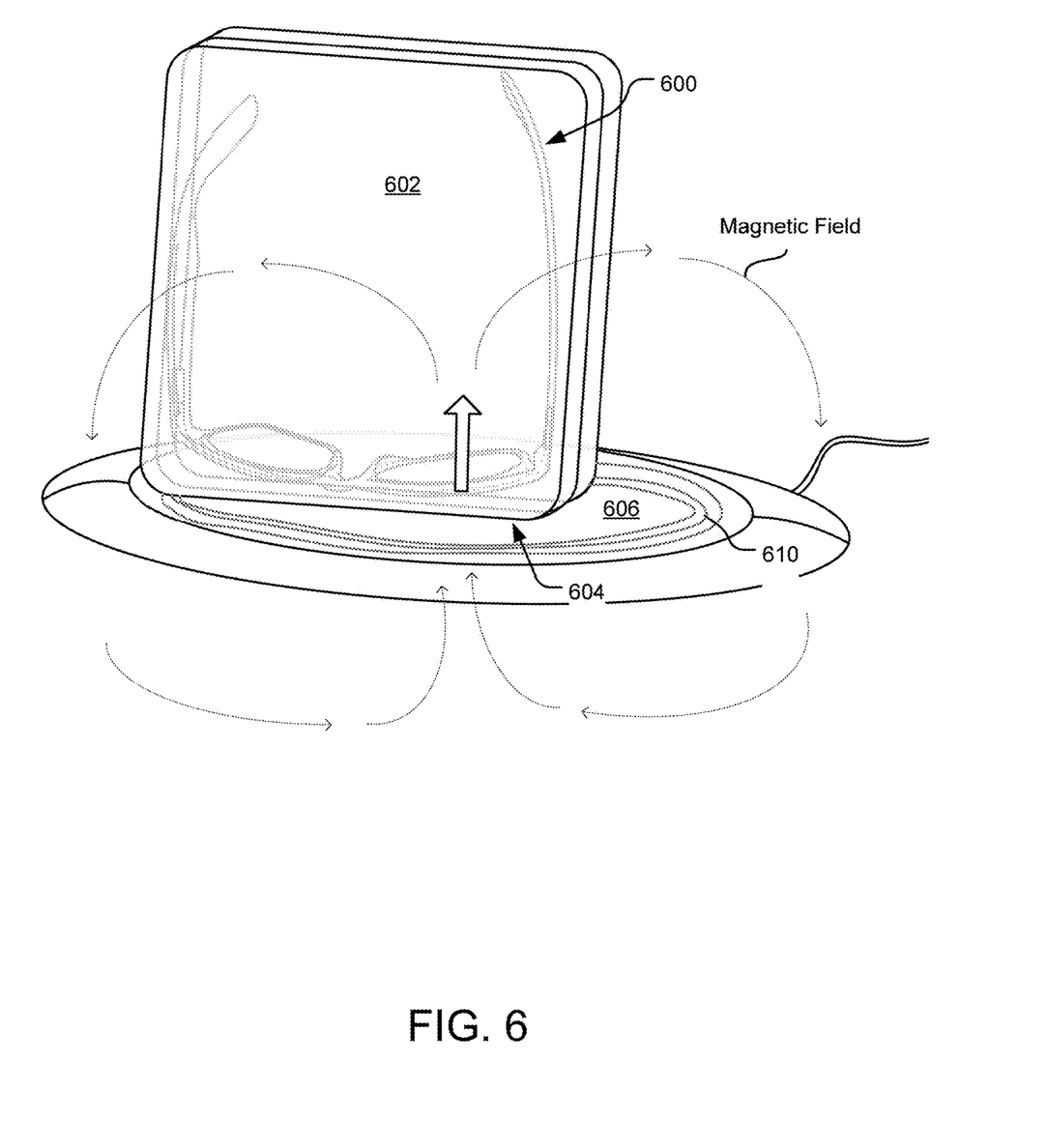
FIG. 6 illustrates yet another example HMD device that includes a wireless charging coil embedded within a bezel of the HMD device and forming one or more loops around an eyepiece of the HMD device.

FIG. 6 illustrates yet another example HMD device 600 with at least one wireless charging coil included within a device frame such that the wireless charging coil includes loops encircling one or both eyepieces, as shown and described with respect to either of FIG. 1, 2, or 4. The HMD device 600 is shown to be secured within a case 602 that is positioned on top of a charging pad 606. The case 602 is positioned on an end 604 such that the eyepieces of the HMD device 600 are generally parallel to a plane defined by the underlying charging pad 606.

The charging pad 606 includes a charging coil 610 with loops encompassing an area generally aligned with the area encompassed the loops formed by the wireless charging coil(s) of the HMD device 600. When AC current flows through the charging coil 610, an alternating magnetic field is generated. Arrows in FIG. 6 illustrate exemplary magnetic field lines in a first direction, and it is to be understood that the magnetic field direction alternates rapidly back and forth between the direction shown and the opposite direction.

In this configuration, the case 602 serves to secure and protect the HMD device 600 but does not act as a charging source. The charging pad 606 is, in one implementation, of a specification compatible with other types of wirelessly chargeable electronic devices such that a user may utilize a same charging pad to charge the HMD device 600 as well as other personal electronics such as a phone, watch, earbuds, etc. Placing the HMD device within the case 602 ensures that fragile optical components of the HMD device 600 are not damaged during charging because the user does not need to place the eyepiece lenses of the HMD device 600 in direct contact with the charging pad 606. Specific aspects of the HMD device 600 not described specifically may be assumed the same or similar to other implementations described herein.

Figure 7:
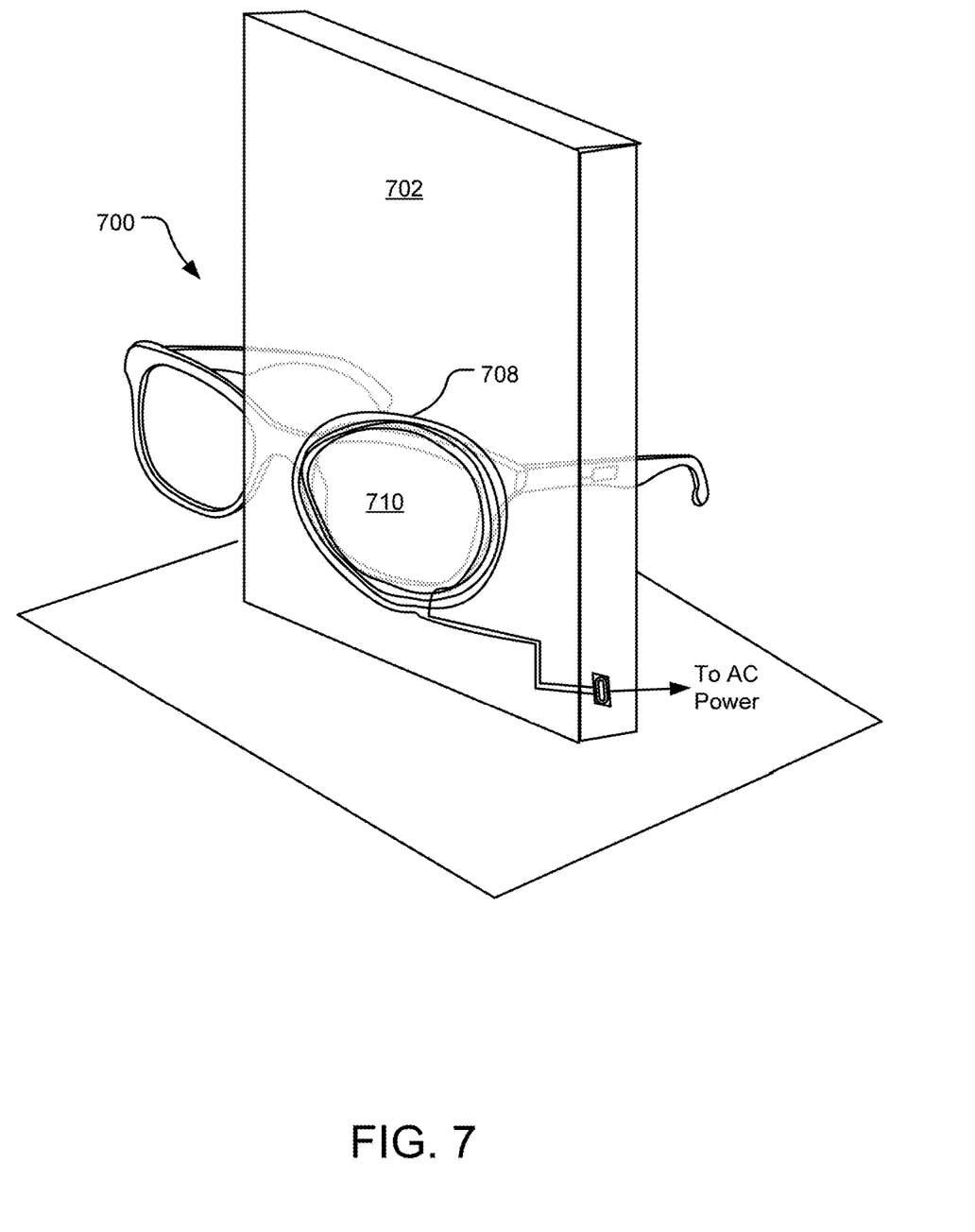
FIG. 7 illustrates yet another example HMD device with wireless charging capability.

FIG. 7 illustrates an example HMD device 700 being wirelessly charged by a vertical charging panel 702. The vertical charging panel 702 includes a wireless charging coil 708 sized and shaped to encompass an area that 710 that generally aligns with an eyepiece of the HMD device 700 when the HMD device 700 is positioned for charging, as shown. The wireless charging coil 708 is oriented in a vertical plane substantially perpendicular (e.g., within +/−5% of perpendicular) to an underlying surface, such as a table, floor, etc. supporting the vertical charging panel 702 and HMD device 700.

The HMD device 700 includes at a wireless charging coil around the eyepiece aligned with the area 710 (e.g., a wireless charging coil as shown and described with respect to FIG. 1). In the illustrated configuration, the HMD device 700 is oriented with eyepieces substantially parallel (e.g., within +/−5% of parallel) to the vertical charging panel 702, and both the eyepieces and vertical charging panel 702 are oriented substantially perpendicular to an underlying surface. In this implementation, charging is achieved using the same or similar circuitry and principles as that described with respect to FIG. 3. The vertical configuration of the vertical charging panel 702 facilitates wireless charging of the HMD device 700 without a first placing the HMD device 700 within a case and also without orienting the eyepieces downward against the underlying surface (e.g., as in the HMD device configuration of FIG. 5). Other aspects of the understood as being the same or similar as that described with respect to other implementations described and shown.

Figure 8:
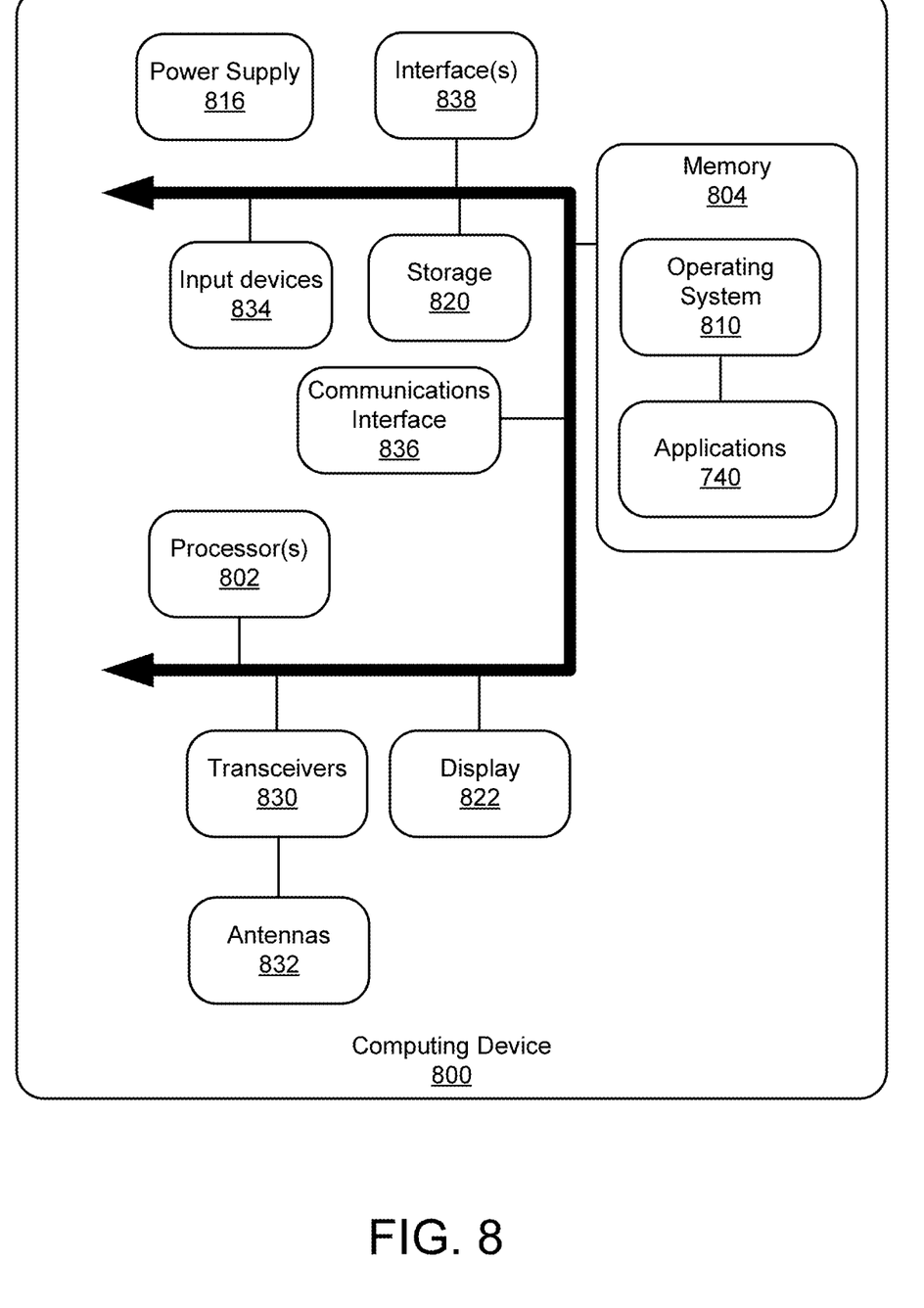
FIG. 8 illustrates an example computing device supporting a wireless charging coil.

FIG. 8 illustrates an example computing device 800 supporting a wireless charging coil. The computing device 800 may be a client device, such as a laptop, mobile device, desktop, tablet, or a server/cloud device. The computing device 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor(s) 802.

One or more applications 840 are loaded into the operating system 810 on the memory 804 and/or storage 820 and executed by the processor(s) 802. The storage 820 may be local to the computing device 800 or may be remote and communicatively connected to the computing device 800 and may include another server. The storage 820 may store resources that are requestable by client devices (not shown).

The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 may include one or more communication transceivers 830 which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The one or more antennas 832 may include the structural slot antenna. The computing device 800 may further include a network adapter 836, which is a type of communication device. The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard or mouse). These and other input devices may be coupled to the server by one or more interfaces 838 such as a serial port interface, parallel port, or universal serial bus (USB). The computing device 800 may further include a display 822 such as a touch screen display.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example system discloses herein includes an electronic device including an eyepiece and a wireless charging coil forming at least one loop around the eyepiece. The wireless charging coil is coupled to a rechargeable battery and adapted to inductively charge the rechargeable battery when the electronic device is positioned such that the wireless charging coil is within a magnetic field generated by a wireless charging source.

In another example system of any preceding system, the electronic device is a head-mounted display (HMD) device.

In still another example system of any preceding system, the HMD device includes optics and electrical components adapted to provide at least one of a virtual reality or an augmented reality experience to a user.

In still another example system of any preceding system, the wireless charging coil is included within a bezel that surrounds and supports the eyepiece.

In yet still another example system of any preceding system, the wireless charging coil forms the at least one loop around a first eyepiece and the electronic device includes another wireless charging coil that forms at least one loop around a second eyepiece.

Another example system of any preceding system further comprises a charging case sized and shaped to store the electronic device. The charging case includes a power source and a sidewall panel embedding a wireless charging coil. The sidewall panel rests adjacent to the wireless charging coil in the HMD device when the HMD device is positioned in a charging configuration within the charging case.

In still another example system of any preceding system, the system further includes a charging panel adapted to stand substantially perpendicular an underlying support surface, the charging panel being adapted to charge the electronic device when the eyepiece is positioned with a lens substantially parallel to the charging panel.

In yet still another example system of any preceding system, the rechargeable battery is included within a frame of the HMD device.

In still another example system of any preceding system, the wireless charging coil is positioned to flow current around a perimeter of the eyepiece.

An example method disclosed herein provides for charging an electronic device with an eyepiece by positioning the electronic device adjacent to a charging source such that a wireless charging coil within the electronic device receives a changing magnetic flux generated by the charging source. The wireless charging coil forms at least one loop around a perimeter of the eyepiece.

In still another example method of any preceding method, the electronic device is a head-mounted display (HMD) device.

In another example method of any preceding method, the wireless charging coil is included within a bezel that surrounds and supports the eyepiece.

In still another example method of any preceding method, the wireless charging coil forms the at least one loop around a first eyepiece and the electronic device includes another wireless charging coil that forms at least one loop around a second eyepiece.

In another example method of any preceding method, charging the electronic device further comprises positioning the electronic device within a charging case sized and shaped to store the HMD device, the charging case including a power source and a sidewall panel embedding a wireless charging coil, the sidewall panel resting adjacent to the wireless charging coil in the HMD device when the HMD device is positioned in a charging configuration within the charging case.

In yet another example method of any preceding method, charging the electronic device further comprises placing the electronic device on a support surface with a lens of the eyepiece being substantially perpendicular to the support surface and substantially parallel to a charging panel.

In still another example method of any preceding method, the wireless charging coil forms a loop around a lens of the electronic device.

In another example method of any preceding method, the HMD device includes a frame and a rechargeable battery affixed along the frame.

In yet still another example method of any preceding method, the wireless charging coil is positioned to flow current around a perimeter of the eyepiece.

An example system disclosed herein includes an HMD device and a case. The HMD device includes an eyepiece and a wireless charging coil forming at least one loop around a perimeter of the eyepiece. The case is sized and shaped to store the HMD device and includes a power source and a wireless charging coil. The wireless charging cable is embedded within a sidewall panel that rests adjacent to the wireless charging coil in the HMD device when the HMD device is positioned within the case.

In another example system of any preceding system, the HMD device is a virtual reality device and/or augmented reality device and the wireless charging coil is included within a bezel encircling the eyepiece.

A system disclosed herein includes a means for charging an electronic device by positioning the electronic device adjacent to a charging source such that a wireless charging coil within the electronic device receives a changing magnetic flux generated by the charging source, the wireless charging coil forming at least one loop around a perimeter of the eyepiece.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
    an electronic wearable device adapted to provide at least one of a virtual reality or an augmented reality experience to a user, the electronic wearable device including:
       optical components including an eyepiece;
       a rechargeable battery; and
       a wireless charging coil positioned to form at least one loop around the eyepiece, the wireless charging coil being coupled to the rechargeable battery and adapted to inductively charge the rechargeable battery when the electronic wearable device is positioned such that the wireless charging coil is within a magnetic field generated by a wireless charging source; and
    a charging case sized and shaped to store the electronic wearable device, the charging case including a sidewall panel embedding a wireless charging coil, the sidewall panel being substantially parallel to the eyepiece of the electronic wearable device when the electronic wearable device is positioned in a charging configuration within the charging case.

2. The system of claim 1, wherein the wireless charging coil of the electronic wearable device is included within a bezel that surrounds and supports the eyepiece.

3. The system of claim 1, wherein the wireless charging coil of the electronic wearable device forms the at least one loop around a first eyepiece and wherein the electronic wearable device includes another wireless charging coil that forms at least one loop around a second eyepiece.

4. The system of claim 1, wherein the wireless charging coil of the electronic wearable device includes a transparent trace attached to a lens of the eyepiece.

5. The system of claim 1, wherein the wireless charging coil of the electronic wearable device is positioned to flow current around a perimeter of the eyepiece.

6. The system of claim 1, wherein the electronic wearable device is a wearable headset with on-board electronics for generating at least one of virtual reality and augmented reality effects.

7. A method comprising:
    positioning an eyepiece of a head-mounted display (HMD) device adjacent to a wireless charging coil in a wireless charger, the HMD device being at least one of an augmented reality or a virtual reality device and including a wireless charging coil forming at least one loop around a perimeter of the eyepiece, wherein the wireless charger includes a sidewall panel embedding a wireless charging coil, the sidewall panel being substantially parallel to the eyepiece of the HMD device when the HMD device is positioned in a charging configuration relative to the wireless charger; and coupling a power supply to the wireless charger to generate a magnetic field that induces a current in the wireless charging coil around the perimeter of the eyepiece.

8. The method of claim 7, wherein the wireless charging coil in the HMD device is included within a bezel that surrounds and supports the eyepiece.

9. The method of claim 7, wherein the wireless charging coil in the HMD device forms the at least one loop around a first eyepiece and the HMD device includes another wireless charging coil that forms at least one loop around a second eyepiece.

10. The method of claim 7, wherein positioning the eyepiece of the HMD device adjacent to the wireless charging coil further comprises:

placing the HMD device on a support surface with a lens of the eyepiece being substantially perpendicular to the support surface and substantially parallel to the sidewall panel.

11. The method of claim 7, wherein the wireless charging coil forms a loop around a lens of the HMD device.

12. The method of claim 7, wherein the wireless charging coil is positioned to flow current around a perimeter of the eyepiece.

13. A system comprising:

an HMD device including an eyepiece and a wireless charging coil forming at least one loop around a perimeter of the eyepiece; and a charging device for charging the HMD device, the charging device including a wireless charging coil embedded within a panel that rests adjacent to the wireless charging coil in the HMD device when the HMD device charging, the panel being substantially parallel to the eyepiece of the HMD device when the HMD device is positioned in a charging configuration relative to the charging device.

14. The system of claim 13, wherein the HMD device is at least one of a virtual or augmented reality device and the wireless charging coil of the HMD device is included within a bezel encircling the eyepiece.

15. The system of claim 13, wherein the wireless charging coil of the HMD device includes a transparent trace attached to a lens of the eyepiece.

16. The system of claim 13, wherein the wireless charging coil of the HMD device is positioned to flow current around a perimeter of the eyepiece.

17. The system of claim 13, wherein the charging device is a case sized and shaped to store the HMD device, the panel of the HMD device embedding the wireless charging coil being a sidewall panel of the case that rests adjacent to the wireless charging coil in the HMD device when the HMD device is positioned within the case.

18. The system of claim 13, wherein the panel of the charging device is adapted to stand substantially perpendicular to an underlying support surface and the charging device is adapted to charge the HMD device when the eyepiece is positioned with a lens substantially parallel to the panel.

19. The system of claim 13, wherein the HMD device includes a frame and a rechargeable battery affixed along the frame.

\* \* \* \* \*